3,037,982
PHENYLPIPERAZINYLALKYL
PROPIONANILIDES

Otis E. Fancher and Shin Hayao, Elkhart, Ind., assignors to Miles Laboratories, Inc., Elkhart, Ind., a corporation of Indiana
No Drawing. Filed Aug. 12, 1959, Ser. No. 833,140
3 Claims. (Cl. 260—268)

This invention relates to novel chemical compounds, to pharmaceutical compositions therewith and to methods for their use. It pertains particularly to phenylpiperazinylalkyl propionanilides which possess useful physiological properties as analgetic agents for the alleviation of pain.

More specifically, the new compounds may be designated as N-[1- or 2-methyl-2-(4-phenyl-1-piperazinyl)-ethyl]propionanilides and are represented by the following structural formula:

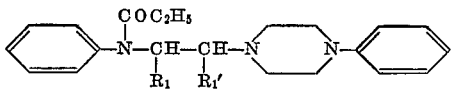

wherein $R_1$ and $R_1'$ represent interchangeably a hydrogen atom and a methyl group.

The above formula thus covers two position isomers wherein the methyl group is attached to either the first or the second carbon atom of the alkyl portion of these novel compounds; and both of them exhibit excellent physiological activity. These isomers will be referred to hereinbelow as the 1-methyl and 2-methyl isomers.

The above-defined compounds are related to certain compounds which form the subject matter of U.S. patent application Serial No. 816,394, filed May 28, 1959, assigned to the assignee of the present invention and entitled, "N-(Aminoalkyl)Anilides." However, the amine moiety of the compounds disclosed in Serial No. 816,394 has been substantially modified, since the present pharmaceutical agents were conceived, as it were, as synthetic products made up of moieties derived from both methadone and meperidine by replacing a phenyl group and a quaternary carbon atom of methadone and a carbethoxy group and a quaternary carbon atom of meperidine by relatively neutral nitrogen atoms. This bifunctional amine moiety, however, is not entirely neutral but is only weakly basic due to its phenyl substituent.

With respect to the preparation of these new compounds, it has been found that the use of one general method of synthesis results in a mixture of the two isomers. Such a general method of preparation is illustrated in detail by Example I as follows:

EXAMPLE I

N-[1(2)-Methyl-2-(4-Phenyl-1-Piperazinyl)Ethyl]-
Propionanilide Oxalate—MA-793

1-phenyl-4-(2-hydroxypropyl)piperazine.—1-phenylpiperazine (81.0 g., 0.5 mole) and propylene oxide (40 g., 0.69 mole) in 150 ml. of methanol were gently refluxed for 2 hours to give, after removing the solvent, 69.7 g. (63.2%) of the product.

1-phenyl-4-(2-chloropropyl)piperazine dihydrochloride.—A solution of 1-phenyl-4-(2-hydroxypropyl)piperazine (82.9 g., 0.38 mole) in 350 ml. of chloroform was saturated with dry hydrogen chloride and then 60.0 g. (0.5 mole) of thionyl chloride in 50 ml. of chloroform was added dropwise during 45 minutes with stirring. The dark slurry was diluted with another 150 ml. of chloroform and heated for an additional 1.5 hours to give a dark solid mass which was kept at room temperature overnight. The solid was collected by suction and once recrystallized from methanol-ether to give 62.7 g. of a colorless solid melting at 209–213°. A sample was again recrystallized from methanol-ethyl acetate to give a pure sample of M.P. 211.5–212°(d.).

Analysis.—Calcd. for $C_{13}H_{21}Cl_3N_2$: HCl, 23.4. Found: HCl, 23.3.

Final product.—A sodio derivative of propionanilide (17.9 g., 0.12 mole) was prepared with 2.8 g. (0.122 atom) of sodium in 200 ml. of xylene. Meanwhile, 1-phenyl-4-(2-chloropropyl)piperazine dihydrochloride (37.4 g., 0.12 mole) was treated with aqueous sodium hydroxide and the free base thus liberated was quickly extracted with xylene (150 ml). The dried xylene solution was added to the sodio derivative during 15 minutes, and the reaction mixture was refluxed with stirring for 3 hours to give a brown, clear solution which was stirred at room temperature overnight. After treatment with water the xylene layer was separated and extracted with dilute hydrochloric acid and the free base was liberated from the acidic extract by addition of aqueous sodium hydroxide. It was extracted with ethyl acetate and with ether. The extract was dried and the solvent was removed in vacuo to leave a syrup which was distilled to give a light yellow liquid of B.P. 201–208° (0.8–0.09 mm.), yield 25.8 g.

Analysis.—Calcd. for $C_{22}H_{19}N_3O$: N (basic), 3.99. Found: N (basic), 4.06.

To the ethereal solution of the free base was added anhydrous oxalic acid (6.7 g., 0.074 mole) in a small amount of absolute ethanol to give a clear solution, which was concentrated and ether was added to separate a colorless powder of M.P. 164–167° (dec.) yield 24.1 g. It was once recrystallized from methanol-ether to give a pure oxalate melting at 166–168° (d.), yield 20.4 g.

Analysis.—Calcd. for $C_{22}H_{29}N_3O \cdot C_2H_2O_4$: N, 9.52. Found: N, 9.66.

In order to synthesize the pure isomers separately, a different scheme of reactions, particularly a diverse sequence of reaction steps, must be used. The following examples, Examples II and III, will more specifically illustrate these methods:

EXAMPLE II

N-[2-Methyl-2-(4-Phenyl-1-Piperazinyl)Ethyl]
Propionanilide Oxalate—MA-799

α-Bromopropionanilide.—To an ice-cold solution of 2-bromopropionyl bromide (23.9 g., 0.11 mole) in 150 ml. of benzene was added slowly aniline (21.5 g., 0.23 mole). The mixture was set aside overnight. The solid was collected by filtration, stirred in water to remove the salt and the insoluble oily solid which remained was extracted with ether and added to the benzene filtrate. The combined organic solution was dried, concentrated and Skelly B was added to separate a colorless solid of M.P. 101–102°, yield 22.7 g. (90.5%).

2-(4-phenyl-1-piperazinyl)propionanilide.—A mixture of 1-phenylpiperazine (16.2 g., 0.1 mole), the above bromoanilide (22.7 g., 0.1 mole) and anhydrous sodium carbonate (10.6 g., 0.1 mole) in 250 ml. of isopropanol was heated under reflux for 16 hours with stirring. On cooling there separated a colorless solid mass which was added to ca. 500 ml. of water. The solid was collected by suction, washed with water and dried, yield 27.9 g. (90.5%) M.P. 165–166°. A sample was once recrystallized from aqueous acetone to give a crystalline solid of M.P. 165–165.5°.

Analysis.—Calcd. for $C_{19}H_{23}N_3O$: N (basic), 4.53. Found: N (basic), 4.50 (non-aqueous titration).

Final products.—To a slurry of lithium aluminum hydride (5 g., 0.132 mole) in 150 ml. of dry tetrahydrofuran (T.H.F.) was added dropwise a solution of the above amide (27.1 g., 0.0875 mole) in 250 ml. of warm T.H.F. during 20 minutes with stirring. The resulting gray mixture was stirred under reflux for 3 hours and set aside overnight. The excess hydride was decomposed as usual, filtered and the filtrate was dried. The solvent was removed in vacuo, leaving a pale yellow syrup which was dissolved in 100 ml. of benzene and 25 ml. of propionic anhydride was added to give a dark solution. This was heated on a steam bath for 45 minutes and the solvent was removed in vacuo, leaving a dark oil which was treated with sodium hydroxide solution and extracted with ether. A solution of anhydrous oxalic acid (7.8 g., 0.87 mole in 40 ml. of absolute ethanol) was added to the dried ether extract to give a light tan solid which was collected by suction, washed with ether and dried in vacuo, yield 31.8 g. (82.6%). It was once recrystallized from methanol-ether to give a colorless solid of M.P. 172.5–173.5° (d.), yield 26.3 g.

*Analysis.*—Calcd. for $C_{22}H_{29}N_3O \cdot C_2H_2O_4$: N, 9.52. Found: N, 9.54 (Kjeldahl).

EXAMPLE III

*N-[1-Methyl-2-(4-Phenyl-1-Piperazinyl)Ethyl]- Propionanilide Oxalate—MA–802*

*1-phenyl-4-(2-bromopropionyl)piperazine.*—To a well-stirred mixture of 1-phenylpiperazine (60.0 g., 0.37 mole) in 150 ml. of ether and 100 ml. of 20% sodium hydroxide solution was added dropwise with cooling below 15° in an ice-water bath a solution of 2-bromopropionyl chloride (63.3 g., 0.37 mole) in 100 ml. of ether during 45 minutes. A colorless solid separated from the reaction mixture. It was stirred for an additional 2 hours and the solid was collected by suction, washed with water and dried in vacuo, yield 66 g. (60%), M.P. 91–93°. A sample was once recrystallized from acetone-Skelly B to give crystals of M.P. 97–99°.

*Analysis.*—Calcd. for $C_{13}H_{17}BrN_2O$: N (basic), 4.71. Found: N (basic), 4.71 (non-aqueous titration).

*1-phenyl-4-(2-anilinopropionyl)piperazine.*—A suspension of the above bromo compound (21.0 g., 0.071 mole) and aniline (14 g., 0.15 mole) in 150 ml. of benzene was heated under reflux with stirring for 6 hours and set aside overnight. The salt which separated was filtered off, washed with benzene and the filtrate was freed from solvent in vacuo, leaving a dark oil which was triturated with water and ether to yield a solid of M.P. 128–130°, yield 16.2 g. (74%). A sample was once recrystallized from methanol-ether (Norit) to give crystals of M.P. 133–133.5°.

*Analysis.*—Calcd. for $C_{19}H_{23}N_3O$: N (basic), 9.06. Found: N (basic), 8.89 (non-aqueous titration).

*Final product.*—To a stirred slurry of 4 g. (0.11 mole) of lithium aluminum hydride in 125 ml. of dry tetrahydrofuran (T.H.F.) was added a solution of the above amide (16.2 g., 0.052 mole) in 200 ml. of dry T.H.F. over an hour period. It was refluxed with stirring for an additional 3 hours and set aside overnight. The excess hydride was decomposed as usual. The mixture was filtered and the filtrate was dried over anhydrous magnesium sulfate. The solvent was removed in vacuo and the remaining syrup was taken up in 150 ml. of benzene. Propionic anhydride (20 ml.) was added to the solution which was refluxed for an hour. The solvent was again removed in vacuo and the remaining syrup was triturated with aqueous sodium hydroxide and extracted with ether. To the dried ethereal solution was added 10 g. of anhydrous oxalic acid in 50 ml. of absolute ethanol to separate a solid of M.P. 145–150° (d.), yield 10.5 g. From the filtrate an additional 7.5 g. of the product melting at 154–156° (d.) was obtained. Thus, the total yield was 18.0 g. (78%). It was once recrystallized from methanol-ether to give 16.5 g. of colorless powder of M.P. 153–155° (d).

*Analysis.*—Calcd. for $C_{22}H_{29}N_3O \cdot C_2H_2O_4$: N, 9.50. Found: N, 9.68 (Kjeldahl).

The present compounds may be obtained as free bases having the formula given above or, for pharmaceutical use, preferably as non-toxic, water-soluble acid addition salts of halogen acids, sulfuric acid, maleic acid and the like. Especially preferred and illustrated in the above examples is the salt of oxalic acid.

It is of course to be understood that the foregoing examples are illustrative only and that various changes can be made with respect to the reactants, conditions and proportions disclosed without departing from the spirit of the invention as set forth in the appended claims.

PHARMACOLOGY

The novel compounds of this invention, as pointed out above, have utility as physiologically active agents and have been found to be potent analgetics with an activity of the type and order exhibited by morphine. These new anilides contain moieties which are also present in well known analgetic agents, such as methadone and meperidine and similar morphine-like analgetics. Analytically, they are at the same time nitrogen analogs of (iso)methadone with the quaternary carbon and one of its adjacent phenyl groups replaced by nitrogen and of meperidine wherein nitrogen replaces the quaternary carbon and its adjacent carbethoxy group. The 1-methyl isomer, it has been found, exhibits a higher degree of physiological activity.

The data on analgetic activity in rats for the new compounds given in the table below were obtained by means of the following screening techniques:

(1) *Anti-nocialgesia (by toe or tail pinch) screen.*— This screen is carried out by applying nociception by pinching the toes and/or tail, and noting the (*a*) vocalization and (*b*) motor responses. These responses result from the excitation of surface or cutaneous pain receptors by nocuous stimuli, and are such that the responses to mechanical pinching equal those to heat by radiation or conduction, or electricla or chemical stimulation, permitting the determination of comparable acute median anti-nocialgetic doses or A–AND50s without recourse to more complicated instrumentation, especially since the criterion of block is complete absence of vocalization and motor responses to maximal stimulation.

(2) *Anti-pressalgesia screen.*—This screen involves a method for exciting the deep or subcutaneous receptors by pressure stimulation of the pad of the normal and yeast inflamed feet of rats, and the cutaneous pain receptors which have been rendered hypersensitive to pressure and other forms of stimulation besides nociception following inflammation. Pressure applied by means of a metal peg causes the rat to struggle and attempt to escape from and/or attack the peg.

Inflammation is produced by the subcutaneous injection of 0.1 ml. of 20% brewer's yeast into the pad of the right hind foot. The yeast causes the foot to swell and become hypersensitive to touch and pressure within an hour, both changes progressing with increasing local congestion and temperature to reach their respective peaks between the fifth and sixth hours.

Compounds are given orally at 20% A–LD50 to each of five rats, three hours after brewer's yeast is injected into the right hind foot pad. At 60 minutes after drug and 240 minutes after yeast, the threshold for pressalgesia is determined in duplicate in both normal (left) and yeast inflamed (right) foot. Another reading is made at 180 minutes after drug (or 360 minutes after yeast). An anti-pressalgetic effect is deemed to have been obtained when the pressure threshold exceeds the control mean +3SD. The acute median anti-pressalgetic dose or A–APD50 is determined if the quantal result at 20% A–LD50 screening level is equal to or greater than 3/5.

(3) *Anti-local congestion screen.*—The local temperature of the yeast inflamed foot increases $8.4 \pm 1.2°$ C. in about three hours after yeast injection. The temperature is taken with an Electric Universal Thermometer placing a thermocouple in contact with the foot pad for two seconds. This gives a measure for the congestion accompanying the inflammation and is carried out prior to the anti-pressalgesia test. Reference analgetics like morphine or aminopyrine given three hours after yeast injection reduce the local temperature of the inflamed foot, presumably by vasoconstriction which reduces congestion (blood flow). A local foot temperature equal to or less than control mean −3SD is taken as the critical level for quantal scoring.

(4) *Anti-writhing (alloxan) screen.*—Writhing is induced in rats in 4.6±4.8 minutes by the intraperitoneal injection of 35 mg./kg. of 0.25% alloxan. Compounds are screened for anti-writhing activity at 20% A–LD50 (RatOR) by injecting alloxan intraperitoneally approximately 60 minutes after the administration of compound. The criterion of an anti-writhing effect is based on latency. Thus, the rats which fail to writhe during the mean latent period plus three standard deviations (20 minutes) are scored as being blocked, and the acute median anti-writhing dose or A–AWD50 is determined if the quantal score is equal to or greater than 3/5.

frequently as conditions demand, and it is understood, of course, that for children the dosages are correspondingly smaller, depending upon the age and weight of the child, as those skilled in the art will appreciate.

The following examples will illustrate in detail typical procedures for preparing a number of representative dosage unit forms of our compositions in accordance with this invention:

EXAMPLE IV

A pharmaceutical composition having the following formulation was prepared:

| | Mg. |
|---|---|
| N-[1-methyl-2-(4-phenyl-1-piperazinyl)ethyl] propionanilide oxalate | 50.0 |
| Lactose | 200.0 |
| Magnesium stearate | 5.0 |

The propionanilide is mixed with the lactose and thoroughly wetted with water. The wetted material is then RELATIVE ANALGETIC POTENCIES (ED50's) OF PROPIONANILIDES AND MORPHINE

| Compound | Hyper-Activity, Percent | Plastic Rigidity, Percent | "Antalgesia" | | | | | Analgesia | | Lethal A–LD50 (RatOR) mg./kg. |
|---|---|---|---|---|---|---|---|---|---|---|
| | | | Anti-pressalgesia | | A-Local Congest., Percent | Anti-Pyresis, Percent | Anti-Writhing, Percent | A-Nocialgesia | | |
| | | | N. ft., Percent | Infl. ft., Percent | | | | mechan., Percent | thermal, Percent | |
| MA-793 | None | 57 | 20 | 20 | 21 | 21 | <20 | 23 | 35 | 70 |
| MA-799 | None | 15 | <u>14</u> | <u>14</u> | <u>18</u> | <u>18</u> | <20 | <u>21</u> | <u>27</u> | 170 |
| MA-802 | None | 12 | <u>12</u> | 6 | <u>13</u> | 14 | <20 | 11 | 14 | 220 |
| Morphine | None | <u>19</u> | 7 | 5 | 14 | <u>21</u> | <20 | 11 | <u>11</u> | 470 |

Figures underlined indicate activity ≥3 hours.
Percent, ED50 in percent A–LD50 (RatOR).
"Antalgesia" denotes non-narcotic analgesia.

PHARMACEUTICAL COMPOSITIONS

Pharmaceutical compositions which have utility as analgetic materials are conveniently and easily produced by combining a compound of the class hereinbefore described with fillers, carriers, extenders and/or excipients, such as are generally used in the preparation of pharmaceutical products which are to be taken orally or given parenterally, especially for human use. The compounds may be used in the form of the free base or of the salts of acids which are water-soluble and non-toxic, such as the hydrochloride, hydrobromide, sulfate and the like. The compositions may be either in solid or liquid state and may be compounded as tablets, powders, capsules, suspensions and similar dosage forms, particularly useful for oral ingestion. In such form the composition may be prepared by mixing the foregoing compounds either in the form of a free base or the water-soluble non-toxic salts, with such common diluents or tabletting adjuncts as cellulose powder, cornstarch, lactose, talc, stearic acid, magnesium stearate, gums and the like, in accordance with conventional manufacturing practices common in the art.

Where the product is to be administered parenterally, the compounds, preferably in the form of their non-toxic, water-soluble salts, may be associated with such carriers as water, saline solution, glucose solution, and the like.

We have found that for oral administration a suitable dosage unit is from about 50 to 300 milligrams of the compound per tablet, capsule or other dosage form. Where the material is to be administered parenterally, then a suitable dosage unit would be from about 35 to 300 milligrams of the active ingredient.

Dosages as above described may be administered as pressed through a sieve of the desired size and dried in an oven at about 140° F. When dry, the magnesium stearate is added, and the composition is dry-mixed thoroughly. The mixed material is then compressed into tablets.

It will be understood that the above example is only representative of one specific form of this invention. Other excipients, such as sucrose, sodium chloride, kaolin, dicalcium phosphate and the like may be used. The excipient may be present in amounts varying from about 30 to 300 parts by weight, depending upon the final formulation. Instead of magnesium stearate as the lubricant, stearic acid, boric acid, and the like are operable. For best results from about 2 to 10 parts by weight of the lubricant is used. It will be understood that any of the anilides described above may be used as the active ingredient of the composition. Depending on the dosage unit desired, from 50 to 300 parts of the desired compound will be used.

EXAMPLE V

For capsules the following formulation was used:

| | Mg. |
|---|---|
| N-[1-methyl-2-(4-phenyl-1-piperazinyl)ethyl]propionanilide oxalate | 500.0 |
| Lactose | 1000.0 |
| Talc | 75.0 |

This material was prepared as described in Example IV above, that is, the propionanilide and the lactose were wetted, sieved, dried and mixed with the talc. Capsules each containing 50 mg. of the active ingredient were prepared.

What is claimed is:

1. N-[2-methyl-2-(4-phenyl-1-piperazinyl)ethyl]propionanilide.
2. N-[1-methyl-2-(4-phenyl-1-piperazinyl)ethyl]propionanilide.
3. A new composition of matter selected from the group consisting of a compound having the formula:
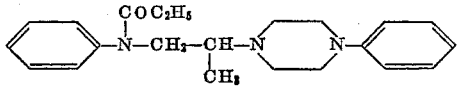
and a compound having the formula:
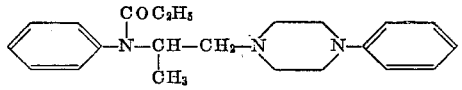
References Cited in the file of this patent
UNITED STATES PATENTS
| | | |
|---|---|---|
| 2,722,529 | Fleming et al. | Nov. 1, 1955 |
| 2,794,804 | Kushner et al. | June 4, 1957 |